(12) United States Patent
Priedeman, Jr.

(10) Patent No.: US 6,645,412 B2
(45) Date of Patent: Nov. 11, 2003

(54) PROCESS OF MAKING A THREE-DIMENSIONAL OBJECT

(75) Inventor: William R. Priedeman, Jr., Long Lake, MN (US)

(73) Assignee: Stratasys, Inc., Eden Prairie, MN (US)

( * ) Notice: Subject to any disclaimer, the term of this patent is extended or adjusted under 35 U.S.C. 154(b) by 322 days.

(21) Appl. No.: 09/854,220

(22) Filed: May 11, 2001

(65) Prior Publication Data

US 2002/0017743 A1 Feb. 14, 2002

Related U.S. Application Data

(63) Continuation-in-part of application No. 09/804,401, filed on Feb. 27, 2001, which is a continuation-in-part of application No. PCT/US00/17363, filed on Jun. 23, 2000, which is a continuation-in-part of application No. PCT/US00/10592, filed on Apr. 11, 2000.
(60) Provisional application No. 60/218,642, filed on Jul. 13, 2000, provisional application No. 60/140,613, filed on Jun. 23, 1999, and provisional application No. 60/130,165, filed on Apr. 20, 1999.

(51) Int. Cl.[7] .......................... B29C 33/40; B29C 41/02
(52) U.S. Cl. ....................................... 264/219; 264/308
(58) Field of Search ................................. 264/219, 308

(56) References Cited

U.S. PATENT DOCUMENTS

| | | | |
|---|---|---|---|
| 5,059,266 A | 10/1991 | Yamane et al. ............... 156/64 |
| 5,503,785 A | 4/1996 | Crump et al. .............. 264/40.7 |
| 5,738,817 A | 4/1998 | Danforth et al. ............. 264/603 |
| 5,900,207 A | 5/1999 | Danforth et al. ............. 264/603 |
| 5,932,055 A | 8/1999 | Newell et al. ............... 156/245 |
| 6,067,480 A | 5/2000 | Stuffle et al. ................ 700/109 |
| 6,070,107 A | 5/2000 | Lombardi et al. ........... 700/119 |
| 6,119,567 A | 9/2000 | Schindler et al. ............. 83/171 |
| 6,165,406 A | 12/2000 | Jang et al. ................... 264/308 |
| 6,214,279 B1 | 4/2001 | Yang et al. .................. 264/482 |
| 6,228,923 B1 | 5/2001 | Lombardi et al. ........... 524/425 |
| 6,322,728 B1 | 11/2001 | Brodkin et al. ................ 264/19 |

FOREIGN PATENT DOCUMENTS

| WO | WO 00/62994 A1 | 10/2000 |
|---|---|---|
| WO | WO 00/78519 A1 | 12/2000 |

Primary Examiner—Leo B. Tentoni
(74) Attorney, Agent, or Firm—Kinney & Lange, P.A.

(57) ABSTRACT

High-performance thermoplastic materials are used in building a three-dimensional model and its supports, by fused deposition modeling techniques. In a preferred embodiment, the thermoplastic resin comprising used as the modeling material is selected from the group consisting of a polycarbonate resin, a polyphenylsulfone resin, and a polycarbonate/acrylonitrile-butadiene-styrene resin. An amorphous thermoplastic resin which self-laminates, bonds weakly to the modeling material, has a heat deflection temperature similar to the heat deflection temperature of the modeling material, and has a tensile strength of between 5000 psi and 12,000 psi is used as a support material. In a preferred embodiment, the thermoplastic resin used as the support material is selected from the group consisting of a polyphenylene ether and polyolefin blend, a polyphenylsulfone and amorphous polyamide blend, and a polyphenylsulfone, polysulfone and amorphous polyamide blend.

32 Claims, 1 Drawing Sheet

PROCESS OF MAKING A THREE-DIMENSIONAL OBJECT

CROSS-REFERENCE TO RELATED APPLICATION(S)

This application is a continuation-in-part of U.S. application Ser. No. 09/804,401, filed Feb. 27, 2001, which claims priority to provisional application Ser. No. 60/218,642, filed Jul. 13, 2000, and which is also a continuation-in-part of PCT International Application No. US00/17363, filed Jun. 23, 2000 (designating the United States), which claims priority to provisional application Ser. No. 60/140,613, filed Jun. 23, 1999. This application is further a continuation-in-part of PCT International Application No. US00/10592, filed Apr. 11, 2000 (designating the United States), which claims priority to provisional application Ser. No. 60/130,165, filed Apr. 20, 1999.

BACKGROUND OF THE INVENTION

This invention relates to the fabrication of three-dimensional objects using additive process modeling techniques. More particularly, the invention relates to forming three-dimensional objects by depositing a first solidifiable material in a predetermined pattern so as to form a three-dimensional object, in coordination with the depositing of a second solidifiable material so as to provide a support structure for the three-dimensional object as it is being built.

Additive process modeling machines make three-dimensional models by building up a modeling medium, based upon design data provided from a computer aided design (CAD) system. Three-dimensional models are used for functions including aesthetic judgments, proofing the mathematical CAD model, forming hard tooling, studying interference and space allocation, and testing functionality. One technique is to deposit solidifiable modeling material in a predetermined pattern, according to design data provided from a CAD system, with the build-up of multiple layers forming the model.

Examples of apparatus and methods for making three-dimensional models by depositing layers of solidifiable modeling material from an extrusion head are described in Valavaara U.S. Pat. No. 4,749,347, Crump U.S. Pat. No. 5,121,329, Batchelder, et al. U.S. Pat. No. 5,303,141, Crump U.S. Pat. No. 5,340,433, Batchelder, et al. U.S. Pat. No. 5,402,351, Crump, et al. U.S. Pat. No. 5,503,785, Batchelder, et al. U.S. Pat. No. 5,764,521, Danforth, et al. U.S. Pat. No. 5,900,207, Batchelder, et al. U.S. Pat. No. 5,968,561 and Stuffle, et al. U.S. Pat. No. 6,067,480, all of which are assigned to Stratasys, Inc., the assignee of the present invention. The modeling material may be supplied to the extrusion head in solid form, for example in the form of a flexible filament wound on a supply reel or in the form of a solid rod, as disclosed in U.S. Pat. No. 5,121,329. As described in U.S. Pat. No. 4,749,347, modeling material may alternatively be pumped in liquid form from a reservoir. In any case, the extrusion head extrudes molten modeling material from a nozzle onto a base. The extruded material is deposited layer-by-layer in areas defined from the CAD model. A solidifiable material which adheres to the previous layer with an adequate bond upon solidification is used as the modeling material. Thermoplastic materials have been found particularly suitable for these deposition modeling techniques.

In creating three-dimensional objects by additive process techniques, such as by depositing layers of solidifiable material, it is the rule rather than the exception that supporting layers or structures must be used underneath overhanging portions or in cavities of objects under construction, which are not directly supported by the modeling material itself. For example, if the object is a model of the interior of a subterranean cave and the cave prototype is constructed from the floor towards the ceiling, then a stalactite will require a temporary support until the ceiling is completed. Support layers or structure may be required for other reasons as well, such as allowing the model to be removed from a base, resisting a tendency for the model to deform while partially completed, and resisting forces applied to a partially completed model by the construction process.

A support structure may be built utilizing the same deposition techniques and apparatus by which the modeling material is deposited. The apparatus, under appropriate software control, produces additional geometry acting as a support structure for the overhanging or free-space segments of the object being formed. Support material is deposited either from a separate dispensing head within the modeling apparatus, or by the same dispensing head that deposits modeling material. The support material is chosen so that it adheres to the modeling material. Anchoring the model to such support structures solves the problem of building the model, but creates the additional problem of removing the support structure from the finished model without causing damage to the model.

The problem of removing the support structure has been addressed by forming a weak, breakable bond between the model and the support structure, such as is described in U.S. Pat. No. 5,503,785. The '785 patent discloses a process by which a material that forms a weak, breakable bond with the modeling material is selected as a support or release material. The support material is deposited at the interface between the object and its support structure, or it is deposited in a layered fashion to form the support structure, in either case permitting the support structure to be broken away after formation of the object.

Stratasys FDM® three-dimensional modeling machines of the current art use as the modeling material an acrylonitrile-butadiene-styrene (ABS) thermoplastic composition or a wax material. A material that has been used for the support material is a high-impact polystyrene. In filament-fed Stratasys FDM® three-dimensional modeling machines of the current art, a filament strand of the modeling material (or support material) is advanced by a pair of motor-driven feed rollers into a liquifier carried by the extrusion head. Inside the liquifier, the filament is heated to a flowable temperature. The liquifier is pressurized by the "pumping" of the strand of filament into the liquifier by the feed rollers. The strand of filament itself acts as a piston, creating a pump. As the feed rollers continue to advance filament into the extrusion head, the force of the incoming filament strand extrudes the flowable material out from the dispensing nozzle where it is deposited onto a substrate removably mounted to a build platform.

An apparatus and method for layered deposition of high strength engineering polymers to manufacture durable three-dimensional objects is disclosed in U.S. Pat. No. 6,067,480. Feed rods of the polymer are extruded from an extrusion cylinder using a piston which is displaced into the cylinder, providing high pressure extrusion accommodating of polymers having low melt flow and long chain lengths. The '480 patent discloses that feed rods of polycarbonate, polyaryletherkotone and poly(methylmethacrylate) were successfully extruded using the extrusion cylinder apparatus. The '480 patent makes no disclosure of support materials.

There is a continuing need to improve model strength and quality, by building models from high-performance engineering thermoplastics. Materials compatible with the modeling process are needed that will provide a suitable support structure for models build from these high-performance materials.

BRIEF SUMMARY OF THE INVENTION

The present invention is high-performance thermoplastic materials used in building a model and its supports, by fused deposition modeling techniques. An amorphous thermoplastic resin having a heat deflection temperature of greater than 120° C. comprises a modeling material. In a preferred embodiment, the thermoplastic resin comprising the modeling material is selected from the group consisting of a polycarbonate resin, a polyphenylsulfone resin, and a polycarbonate/acrylonitrile-butadiene-styrene resin. An amorphous thermoplastic resin which self-laminates, bonds weakly to the modeling material, has a heat deflection temperature similar to the heat deflection temperature of the modeling material, and has a tensile strength of between 5000 psi and 12,000 psi comprises a support material. In a preferred embodiment, the thermoplastic resin comprising the support material is selected from the group consisting of a polyphenylene ether and polyolefin blend, a polyphenylsulfone and amorphous polyamide blend, and a polyphenylsulfone, polysulfone and amorphous polyamide blend.

DETAILED DESCRIPTION

Figure 1:
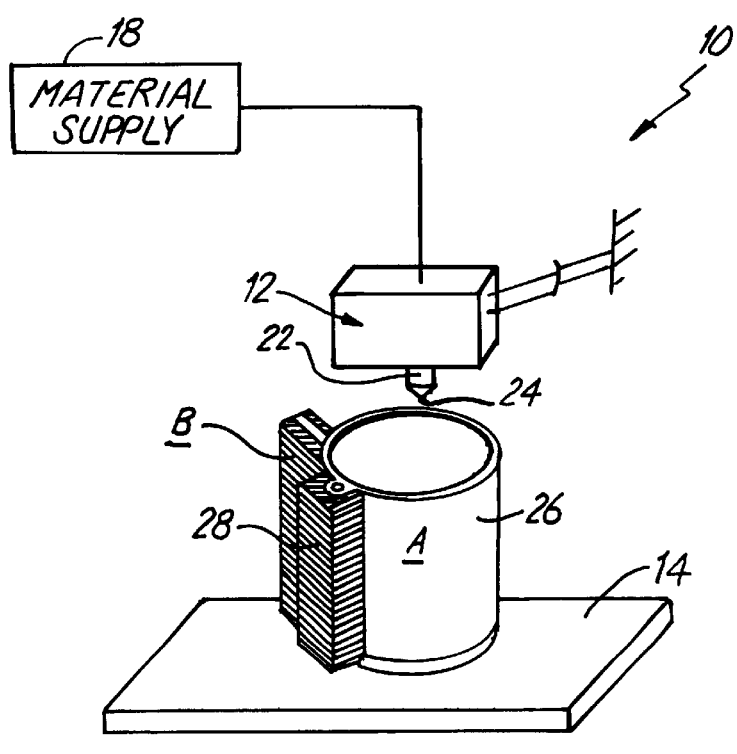
FIG. 1 is a diagrammatic illustration of a model and a support structure therefor formed using layered extrusion techniques.

The present invention is described with reference to a deposition modeling system of the type shown in FIG. 1. FIG. 1 shows an extrusion apparatus 10 building a model 26 supported by a support structure 28 according to the present invention. The extrusion apparatus 10 includes an extrusion head 12, a material-receiving base 14 and a material supply 18. The extrusion head 12 moves in X and Y directions with respect to the base 14, which moves in a vertical Z direction. The material supply 18 supplies a feedstock of material to the extrusion head 12. In the described embodiment, a solid feedstock of material is supplied to the extrusion head 12, and is melted in a liquifier 22 carried by the extrusion head 12. The liquifier 22 heats the feedstock material to a temperature slightly above its solidification point, reducing it to a molten state. Molten material is extruded through an orifice 24 of the liquifier 22 onto the base 14. The feedstock may take the form of a continuous filament, rods, slugs, pellets, granulations or the like.

The movement of the extrusion head is controlled so as to deposit material onto the base 14 in multiple passes and layers to build the three-dimensional model 26 and further to build the support structure 28 defined so as to physically support the model 26 as it is being built. The model 26 and its support structure 28 are build up on the base 14 within a build chamber (not shown) having an environment controlled so as to promote thermal solidification. A first layer of the deposited material adheres to the base 14 so as to form a foundation, while subsequent layers of material adhere to one another.

A modeling material A is dispensed to form the model 26, and a support material B is dispensed in coordination with the dispensing of modeling material A to form the support structure 28. For convenience, the extrusion apparatus 10 is shown with only one material supply 18. It should be understood, however, that in the practice of the present invention, the modeling material A and the support material B are provided to the extrusion apparatus 10 as separate feedstocks of material from separate material supplies. The extrusion apparatus 10 may then accommodate the dispensing of two different materials by: (1) providing two extrusion heads 12, one supplied with modeling material A and one supplied with support material B (such as is disclosed in the Batchelder '561 patent); (2) providing a single extrusion head supplied with both the modeling material A and the support material B, with a single nozzle for dispensing both materials (such as is shown in FIG. 6 of the Crump '329 patent); or (3) providing a single extrusion head supplied with both materials, with each material dispensed through a separate nozzle (such as shown in FIG. 6 of the Crump '785 patent).

In the described embodiment, the modeling material A and the support material B are deposited as substantially continuous "roads" in horizontal layers from an extrusion head, and are supplied to the extrusion head in solid form. It will be understood by those skilled in the art that the invention can be practiced with advantage in various other types of modeling machines as well, and that the materials may alternatively be supplied to the extrusion head in liquid form.

The present invention provides as the modeling material A a high-performance engineering thermoplastic resin having a glass transition temperature above 120° C. and which exhibits insignificant shrinkage upon changing from a liquid to a solid. Preferred thermoplastic resins are selected from the group consisting of a polycarbonate resin, a polycarbonate/acrylonitrile-butadiene-styrene resin and a polyphenylsulfone resin. The support material B of the present invention is a self-laminating thermoplastic resin having a similar heat resistance and shrinkage to the modeling material A, and that laminates weakly to the model such that it can be broken away at the material interface. In addition, the support material B is sufficiently strong to support the model. The thermoplastic materials of the present invention have a higher impact strength, greater toughness, higher heat deflection temperature and more chemical resistance than the materials currently available for fused deposition modeling. As will be recognized by those skilled in the art, the modeling and support materials of the present invention may include fillers and other additives, which may provide additional enhanced properties of the thermoplastic resins.

Rheology of Modeling and Support Materials

The modeling material A and support material B must satisfy a large number of modeling criteria for the particular modeling system in which they are used, relating generally to thermal properties, strength, viscosity and adhesion.

The modeling material A and support material B must have a melt viscosity suitable for the modeling process. Ideally, materials used for fused deposition modeling have low melt viscosity. The melt viscosity must be low enough at the extrusion temperature so that it can be extruded as a generally continuous road or bead. Also, the melt viscosity at the extrusion temperature must be low enough so that deposited roads or beads of material have little melt strength, allowing them to lay flat rather than curl up. Melt viscosity is lowered by increasing the temperature at which the material is extruded. Too high an extrusion temperature, however, can cause heated material sitting idle in the extruder to decompose. If decomposed, in the case of a filament-pump extruder that has no positive cut-off mechanism, the materials will drain uncontrollably from the liquifier into the build envelope, a condition referred to as "ooze". Further, a lower extrusion temperature reduces energy consumption, reduces heat generation and reduces the opportunity to degrade polymeric material.

In theory, the viscosity of a melt is related to the molecular weight of the material, and as it approaches the critical molecular weight, properties diminish. So, the lower limit on melt viscosity is defined as that at the critical molecular weight, but virtually all commercial grade polymers exceed the critical molecular weight to deliver good physical properties.

Melt viscosity may be measured by its inverse parameter, melt flow. A material used to build models in a Stratasys FDM® modeling machine which has a filament-pump extruder must have a high melt flow at the extrusion temperature, so as to be extruded as a continuous bead under a relatively low pressure of about 3000 psi or less. A desirable high melt flow for material deposited by a filament-pump type extruder is greater than about 5 gms/10 minutes, as measured by ASTM D1238, under a load of 1.2 kg at the extrusion temperature. Most preferably, the melt flow is between 5–30 g/10 minutes. A lower melt flow (higher viscosity) is suitable for high pressure extrusion, such as by the apparatus disclosed in U.S. Pat. No. 6,067,480.

To properly support the model under construction, the support material B must bond to itself (self-laminate). The support materials B must form a weak, breakable bond to modeling material A (co-laminate), so that it can be separated from the completed model without causing damage to the model. Where the support structure is built up from the base, support material B must additionally bond to the base.

To produce a dimensionally accurate model, the modeling and support materials must exhibit little shrinkage upon cooling in the conditions of the build envelope. Any shrinkage of the support material B must match that of the modeling material A. A shrink differential in the materials would cause stresses and bond failures along the model/support structure joint. Amorphous polymers typically have a shrinkage upon solidification of less than or equal to 0.010 inch/inch according to ASTM injection-molding test standards. The shrinkage characterisitic of amorphous polymers is acceptable for deposition modeling purposes, while crystalline polymers exhibit shrinkage too high for deposition modeling. Fillers may be added to the materials to reduce shrinkage. Crystalline additives may be added to the materials of the present invention, so long as they are added in an amount small enough so that the materials continue to exhibit the shrinkage characteristic of an amorphous polymer.

Selection of a particular modeling material A can be made according to the particular application of the finished model. The support material B must have sufficient mechanical strength in solid form to provide support to a model during its formation. The support material B must resist forces by the modeling material A, or the model will exhibit undesirable curling and deformation.

The modeling material A and support material B, when supplied in filament or rod form, must be strong enough to be shipped without breaking. When supplied in filament form, the materials must further have the strength and flexibility to be formed into a filament, be spooled and unspooled, and be fed through the extrusion apparatus without breakage. Similarly, materials supplied in filament form must have sufficient rigidity to not be deformed by compressive forces during feeding through the extrusion apparatus.

As to thermal properties, the modeling material A and support material B should have similar heat deflection properties, so that both materials can successfully be extruded into the same build chamber. As taught in U.S. Pat. No. 5,866,058, building the model in a chamber heated to a temperature higher than the solidification temperature of the thermoplastic or other thermally solidifiable modeling material, followed by gradual cooling, relieves stresses from the material. The stresses are annealed out of the model while is being built so that the finished model is stress free and has very little distortion. As is further taught in the '058 patent, a modeling material should have a glass transition temperature ($T_g$) higher than the temperature of the build chamber, so that the model does not become so weak that it droops. The preferred temperature of the build chamber is thus in a range between the solidification temperature of modeling material A and its creep relaxation temperature (creep relaxation temperature is defined as the point at which the stress relaxation modulus has dropped by a factor of ten from its low temperature limit). Likewise, the glass transition temperature of the support material B should be higher than the temperature of the build chamber, so that the support structure will not deform and will maintain structural fidelity of the model that it supports. It has been discovered through experimentation that the glass transition temperature (or heat deflection temperature) of the support material B should be within about 20° C. of the of the modeling material A, preferably with 15° C. The addition of fillers to the materials can have the effect of raising a material's glass transition temperature. In practice, glass transition temperature is indicated by the heat deflection temperature. Heat deflection temperature of the exemplary materials disclosed herein is measured by the DMA softening point of the material.

Compositions of Model and Support Materials

Materials according to the present invention were tested using filament-fed layered deposition modeling machines of the type disclosed in pending U.S. application Ser. No. 09/804,401 and PCT International Application Ser. No. US00/17363 (designating the United States), which are hereby incorporated by reference as if set forth fully herein. The following examples of modeling material A and support material B are given which have been demonstrated to meet the rheology criteria discussed above:

EXAMPLE 1

Modeling Material: The modeling material A is a polycarbonate resin. A particular exemplary polycarbonate resin is Lexan® HF1110 (available from General Electric Plastics). This material has a heat deflection temperature of 156° C., and has a melt flow in the range of 20–30 gms/10 min. at 300° C. under a 1.2 kg load. The polycarbonate resin was successfully extruded from a liquifier having a temperature of about 320° C., into a build chamber having a temperature of about 135° C.

Support Material: The support material B is a resin comprising a blend of polyphenylene ether and a polyolefin, such as a high impact polystyrene. Desirable weight percent ranges are between about 50 and 90 percent polyphenylene ether and between about 10 and 50 percent of the polyolefin. A particular exemplary resin is a blend of 75 weight percent Noryl® 731 polyphenylene ether and 25 weight percent Noryl®N300X high impact polystyrene (each available from General Electric Plastics). This resin has a heat deflection temperature of 178° C., and a melt flow similar to that of the modeling material. This material was extruded from a liquifier having a temperature of about 360° C. to successfully form a support structure for a model built using the polycarbonate resin.

EXAMPLE 2

Modeling Material: The modeling material A is a polycarbonate/acrylonitrile-butadiene-styrene resin. The resin should contain at least about 50 weight percent polycarbonate, in order to provide the material with the enhanced strength and toughness properties of polycarbonate. A particular preferred polycarbonate/acrylonitrile-butadiene-styrene resin is Cycoloy® C1110HF (available from General Electric Plastics). This resin has a heat deflection temperature of 143° C., and a melt flow in the range of 10–20 gms/10 min. at 280° C. under a 1.2 kg load. The polycarbonate/acrylonitrile-butadiene-styrene resin was successfully extruded from a liquifier having a temperature of about 320° C., into a build chamber having a temperature of about 110° C.

Support Material: The support material B is a resin comprising a blend of polyphenylene ether and a polyolefin, such as a high impact polystyrene. Desirable weight percent ranges are between about 40 and 80 percent polyphenylene ether and between about 20 and 60 percent of the polyolefin. A particular exemplary resin is Noryl® 731 (available from General Electric Plastics) polyphenylene ether/polystyrene blend. This resin has a heat deflection temperature of 156° C., and a melt flow similar to that of the modeling material. This material was extruded from a liquefier having a temperature of about 340° C. to successfully form a support structure for a model built using the polycarbonate/acrylonitrile-butadiene-styrene resin.

EXAMPLE 3

Modeling Material: The modeling material A is a polyphenylsulfone resin. A particular exemplary polyphenylsulfone resin is Radel® R 5600 NT (available from BP Amoco). This polyphenylsulfone resin has a heat deflection temperature of 236° C., and a melt flow in the range of 20–30 gms/10 min. at 400° C. under a 1.2 kg load. The polyphenylsulfone resin was successfully extruded from a liquefier having a temperature of about 400° C., into a build chamber having a temperature of about 200° C.

Support Material: The support material B is a resin comprising a blend of polyphenylsulfone and amorphous polyamide. The material may further include polysulfone. Desirable weight percent ranges are between about 60 and 90 weight percent polyphenylsulfone, and between about 10 and 40 weight percent amorphous polyamide blend, or between about 60 and 90 weight percent polyphenylsulfone, between about 1 and 40 weight percent polysulfone and between about 10 and 40 weight percent amorphous polyamide blend. A particular exemplary resin is a blend of 50 weight percent Radel® R 5600 NT polyphenylsulfone (available from BP Amoco), 25 weight percent Udel® P 1710 NT 15 polysulfone (available from BP Amoco), and 25 weight percent EMS TR 70 amorphous polyamide (available from EMS-Chemie AG of Switzerland). This resin has a heat deflection temperature of 224° C. and a melt flow similar to that of the modeling material. This material was extruded from a liquifier having a temperature of about 350° C. to successfully form a support structure for a model built using the polyphenylsulfone resin. Techniques conventional in polymer chemistry were used to compound the component materials into support material B.

Each of the materials given in the above examples exhibited a tensile strength of between 5000 psi and 12,000 psi, and exhibited a shrinkage typical of amorphous polymers (less than 0.010 inch/inch). Each of the materials of the above examples built models having a higher impact strength, greater toughness, higher heat deflection temperature and more chemical resistance than the materials in current use for fused deposition modeling. The materials of Example 3 built a model that was found to have a toughness, impact strength, heat resistance and chemical resistance exceeding that provided by any rapid prototyping methods of the current art.

As mentioned above, the modeling material A and support material B may include inert and/or active filler materials. The fillers can provide enhanced material properties which may be desirable depending upon the intended use of the resulting model. For instance, fillers can provide RF shielding, conductivity, or radio opaque properties (useful for some medical applications). Fillers can alternatively degrade material properties, but this may be acceptable for some uses. For instance, an inexpensive filler can be added to the modeling material A or support material B to decrease the cost of these materials. Fillers can also change thermal characteristics of the materials, for instance a filler can increase the heat resistance of a material, and a filler can reduce material shrinkage upon thermal solidification. Exemplary fillers include glass fibers, carbon fibers, carbon black, glass microspheres, calcium carbonate, mica, talc, silica, alumina, silicon carbide, wollastonite, graphite, metals and salts. An upper limit on the amount of filler material added to the modeling material A and support material B without unacceptably degrading model quality is about 20 weight percent.

Those skilled in the art will recognize that innumerable other additives may also be used in the modeling and support materials of the present invention, to modify properties as desired for particular applications. For instance, the addition of a plasticizer will lower the heat resistance and melt flow of the materials. The addition of dyes or pigments can be done to change color of the materials. An antioxidant can be added to slow down heat degradation of the material in the extruder. Further, small amounts of other polymers may be added to the materials of the present invention. The total amount of fillers and other additives may reach about 30 weight percent while maintaining the fundamental rheology of the modeling and support materials of the present invention.

The modeling and support materials A and B may be molded into rods, pellets or other shapes for use as a modeling feedstock, or it may be used as a liquid feedstock without prior solidification. Alternatively, the mixture may be solidified and then granulated. A granulated feedstock composition may be processed through conventional extrusion apparatus to form continuous flexible filaments. Desirably, these filaments are wound in continuous lengths on a spool and dried. The filament is typically of a very small diameter, on the order of 0.070 inches, and may be as small as 0.001 inches in diameter. The modeling material A and support material B of the present invention have been successfully formed into modeling filament and used in a filament-fed deposition modeling machine.

It is noted that the modeling material A and support material B of the present invention are moisture sensitive. It has been demonstrated that exposure of these materials to a humid environment will significantly degrade model quality, thus, maintaining dry conditions is important. In order for the materials of the present invention to build accurate, robust models by fused deposition techniques, the material must dried. Particularly suitable apparatus for building up three-dimensional objects using the high temperature, moisture-sensitive materials of the present invention are disclosed in pending U.S. application Ser. No. 09/804,401, filed Feb. 27, 2001, and PCT International Application Serial No. US00/17363, filed Jun. 23, 2000 (designating the United States), which are incorporated by reference herein. The '363 application discloses a modeling machine having a high-temperature build chamber, and the '401 application discloses a moisture-sealed filament cassette and filament path for supplying moisture-sensitive modeling filament in a filament-fed deposition modeling machine.

For the modeling material A and support material B of the present invention, an acceptable moisture content (i.e. a level at which model quality will not be impaired) is a level less than 700 parts per million (ppm) water content (as measured using the Karl Fischer method). The '401 application discloses techniques for drying the filament provided in the a filament cassette. One method for drying the material is to place a cassette containing the material in an oven under vacuum conditions at a suitable temperature (between 175–220° F. is typical) until the desired dryness is reached, at which time the cassette is sealed. The cassette may then be vacuum-sealed in a moisture-impermeable package, until its installation in a machine. An expected drying time is between 4–8 hours to reach less than 300 ppm water content. Another method is to dry the material by placing packets of desiccant in the cassette without use of the oven. It has been demonstrated that placing packets containing Tri-Sorb-molecular sieve and calcium oxide (CaO) desiccant formulations in the cassette and sealing the cassette in a moisture-impermeable package will dry the material to a water content level of less than 700 ppm, and will dry the material to the preferred range of 100–400 ppm. This desiccant-only drying method has advantages over the oven-drying method in it requires no special equipment, and is faster, cheaper and safer than oven drying. Suitable Tri-Sorb-molecular sieve desiccant formulations include the following: zeolite, NaA; zeolite, KA; zeolite, CaA; zeolite, NaX; and magnesium aluminosilicate.

The '401 application further discloses a filament delivery system and an active drying system which will preserve the dryness of the material when it is loaded in the modeling machine. The drying system creates an active moisture barrier along a filament path from the cassette to the extrusion head, and purges humid air from the modeling machine. The drying system continuously feeds dry air or other gas under pressure to the filament path, disallowing humid air from remaining in or entering the filament path, and is vented at or near the end of the filament path.

Models formed from the materials of the present invention have greater utility than models formed from materials used in prior art fused deposition modeling applications. For example, models made from materials of the present invention may be used as functional parts for power tools and household appliances, where strength and toughness are important; functional parts for automotive applications, where strength, toughness, high heat resistance and chemical resistance are important; functional parts for medical and dental instruments, where the parts must maintain key properties after repeated cycles of steam sterilization; and functional parts for applications where low flammability and smoke generation is desirable.

It should be noted that while the materials of the present invention have been termed here as either "modeling" or "support" materials, these materials may be interchanged so as to form a model using the so-called "support" material and to form a support structure for that model using the so-called "modeling" material. The materials described herein as modeling materials have properties that are superior, for most applications, to those of the support materials. A model built using a material introduced herein as a modeling material will, for instance, be stronger and tougher a model built using a material introduced herein as a support material. The categorization of the materials herein as either "modeling" or "support" materials is done for convenience of reference, according to the expected typical use of the materials.

Although the present invention has been described with reference to preferred embodiments, workers skilled in the art will recognize that changes may be made in form and detail without departing from the spirit and scope of the invention.

What is claimed is:

1. In a process for making a three-dimensional object by dispensing a first thermally-solidifiable material in molten form at a first extrusion temperature in a predetermined pattern so as to define the three-dimensional object in coordination with dispensing of a second thermally-solidifiable material in molten form at a second extrusion temperature so as to define a support structure for the three-dimensional object, the improvement comprising the steps of:

providing as the first thermally-solidifiable material a modeling material comprising a first thermoplastic resin and having a heat deflection temperature of greater than 120° C.; and providing as the second thermally-solidifiable material a support material comprising a second thermoplastic resin selected from the group consisting of a polyphenylene ether and polyolefin blend, a polyphenylsulfone and amorphous polyamide blend, and a polyphenylsulfone, polysulfone and amorphous polyamide blend.

2. The process of claim 1, wherein the modeling material contains at least 70 weight percent of the first thermoplastic resin and the support material contains at least 70 weight percent of the second thermoplastic resin.

3. The process of claim 1, wherein the first thermoplastic resin comprising the modeling material is selected from a group consisting of a polycarbonate resin, a polyphenylsulfone resin, and a polycarbonate/acrylonitrile-butadiene-styrene resin.

4. The process of claim 1, wherein the modeling material contains up to about 20 weight percent of a filler.

5. The process of claim 1, wherein the support material contains up to about 20 weight percent of a filler.

6. The process of claim 1, wherein the second thermoplastic resin is a polyphenylene ether and polyolefin blend and the first thermoplastic resin is selected from the group consisting of a polycarbonate resin and a polycarbonate/acrylonitrile-butadiene-styrene resin.

7. The process of claim 6, wherein the second thermoplastic resin is a polyphenylene ether and high-impact polystyrene blend.

8. The process of claim 6, wherein the support material contains between about 50 and 90 weight percent polyphenylene ether and between about 10 and 50 weight percent of a polyolefin, and the modeling material contains at least 70 weight percent polycarbonate.

9. The process of claim 6, wherein the support material contains between about 40 and 80 weight percent polyphenylene ether and between about 20 and 60 weight percent of a polyolefin, and the first thermoplastic resin is a polycarbonate/acrylonitrile-butadiene-styrene resin.

10. The process of claim 1, wherein the second thermoplastic resin is selected from the group consisting of a polyphenylsulfone and amorphous polyamide blend and a polyphenylsulfone, polysulfone and amorphous polyamide blend, and the first thermoplastic resin is a polyphenylsulfone resin.

11. The process of claim 10, wherein the second thermoplastic resin is a polyphenylsulfone, polysulfone and amorphous polyamide blend containing between about 60 and 90 weight percent polyphenylsulfone, between about 1 and 40 weight percent polysulfone and between about 10 and 40 weight percent amorphous polyamide blend.

12. The process of claim 10, wherein the second thermoplastic resin is a polyphenylsulfone and amorphous polyamide blend containing between about 60 and 90 weight percent polyphenylsulfone and between about 10 and 40 weight percent amorphous polyamide blend.

13. The process of claim 1, wherein the modeling material has a melt flow in the range of 5 to 30 gms/10 minutes under a 1.2 kg load at the first extrusion temperature, and the support material has a melt flow in the range of 5 to 30 gms/10 minutes under a 1.2 kg load at the second extrusion temperature.

14. The process of claim 1, wherein the heat deflection temperature of the support material is within about 20° C. of the heat deflection temperature of the modeling material.

15. The process of claim 1, and further comprising the steps of:
    using the modeling material to build the support structure; and
    using the support material to build the three-dimensional object.

16. In a process for making a three-dimensional object by dispensing a first thermally-solidifiable material in molten form at a first extrusion temperature in a predetermined pattern so as to define the three-dimensional object in coordination with dispensing of a second thermally-solidifiable material in molten form at a second extrusion temperature so as to define a support structure for the three-dimensional object, the improvement comprising the steps of:
    providing as the first thermally-solidifiable material a modeling material comprising a first thermoplastic resin selected from the group consisting of a polycarbonate resin, a polyphenylsulfone resin, and a polycarbonate/acrylonitrile-butadiene-styrene resin, the modeling material having a heat deflection temperature of greater than 120° C.; and
    providing as the second thermally-solidifiable material a support material that comprises a second thermoplastic resin and which self-laminates, bonds weakly to the modeling material, has a heat deflection temperature of within about 20° C. of the heat deflection temperature of the modeling material, has a tensile strength of between 5000 psi and 12,000 psi, and which has an amorphous shrinkage characteristic.

17. The process of claim 16, wherein the modeling material has a melt flow in the range of 5 to 30 gms/10 minutes under a 1.2 kg load at the first extrusion temperature, and the support material has a melt flow in the range of 5 to 30 gms/10 minutes under a 1.2 kg load at the second extrusion temperature.

18. The process of claim 16, and further comprising the steps of:
    using the modeling material to build the support structure; and
    using the support material to build the three-dimensional object.

19. The process of claim 16, wherein the modeling material contains up to about 20 weight percent of a filler.

20. The process of claim 16, wherein the support material contains up to about 20 weight percent of a filler.

21. The process of claim 16, wherein the modeling material contains at least 70 weight percent of the first thermoplastic resin and the support material contains at least 70 weight percent of the second thermoplastic resin.

22. The process of claim 21, wherein the second thermoplastic resin is selected from the group consisting of a polyphenylene ether and polyolefin blend, a polyphenylsulfone and amorphous polyamide blend, and a polyphenylsulfone, polysulfone and amorphous polyamide blend.

23. The process of claim 22, wherein the second thermoplastic resin is a polyphenylene ether and polyolefin blend and the first thermoplastic resin is selected from the group consisting of a polycarbonate resin and a polycarbonate/acrylonitrile-butadiene-styrene resin.

24. The process of claim 23, wherein the second thermoplastic resin is a polyphenylene ether and high-impact polystyrene blend.

25. The process of claim 24, wherein the support material contains between about 50 and 90 weight percent polyphenylene ether and between about 10 and 50 weight percent high-impact polystyrene, and the modeling material contains at least 70 weight percent polycarbonate.

26. The process of claim 23, wherein the support material contains between about 40 and 80 weight percent polyphenylene ether and between about 20 and 60 weight percent of a polyolefin, and the first thermoplastic resin is a polycarbonate/acrylonitrile-butadiene-styrene resin.

27. The process of claim 22, wherein the second thermoplastic resin is selected from the group consisting of a polyphenylsulfone and amorphous polyamide blend and a polyphenylsulfone, polysulfone and amorphous polyamide blend, and the first thermoplastic resin is a polyphenylsulfone resin.

28. The process of claim 27, wherein the second thermoplastic resin is a polyphenylsulfone, polysulfone and amorphous polyamide blend containing between about 60 and 90 weight percent polyphenylsulfone, between about 1 and 40 weight percent polysulfone and between about 10 and 40 weight percent amorphous polyamide blend.

29. The process of claim 27, wherein the second thermoplastic resin is a polyphenylsulfone and amorphous polyamide blend containing between about 60 and 90 weight percent polyphenylsulfone and between about 10 and 40 weight percent amorphous polyamide blend.

30. An additive process for making three-dimensional objects, comprising the steps of:
    dispensing a modeling material in a flowable state in a predetermined pattern defining a three-dimensional object having overhanging portions that require support during formation, the modeling material comprising a first high-melt flow amorphous thermoplastic resin having a heat deflection temperature of at least 120° C.; and
    dispensing a support material in a flowable state in the space beneath the overhanging portions of the three-dimensional object in coordination with the dispensing of the modeling material to form a three-dimensional support structure for the object, the support material comprising a second high-melt flow amorphous thermoplastic resin which self-laminates, bonds weakly to the modeling material, has a heat deflection temperature of within about 20° C. of the heat deflection temperature of the modeling material, and has a tensile strength of between 5000 psi and 12,000 psi.

31. The process of claim 30, wherein the modeling material contains at least 70 weight percent of the first high-melt flow amorphous thermoplastic resin and the support material contains at least 70 weight percent of the second high-melt flow amorphous thermoplastic resin.

32. The process of claim 31, wherein the high-melt flow amorphous thermoplastic resin is selected from the group consisting of a polycarbonate resin, a polyphenylsulfone resin, and a polycarbonate/acrylonitrile-butadiene-styrene resin, and the second high-melt flow amorphous thermoplastic resin is selected from the group consisting of a polyphenylene ether and polyolefin blend, a polyphenylsulfone and amorphous polyamide blend, and a polyphenylsulfone, polysulfone and amorphous polyamide blend.

* * * * *

UNITED STATES PATENT AND TRADEMARK OFFICE
CERTIFICATE OF CORRECTION

PATENT NO. : 6,645,412 B2
DATED : November 11, 2003
INVENTOR(S) : William R. Priedeman, Jr.

It is certified that error appears in the above-identified patent and that said Letters Patent is hereby corrected as shown below:

<u>Title page,</u>
Item [57], ABSTRACT,
Line 4, delete "comprising"

Signed and Sealed this

Eleventh Day of May, 2004

JON W. DUDAS
*Acting Director of the United States Patent and Trademark Office*